R. T. NEWTON.
BUMPER ATTACHMENT MEANS.
APPLICATION FILED JULY 8, 1920.
1,430,464.
Patented Sept. 26, 1922.
4 SHEETS—SHEET 1.
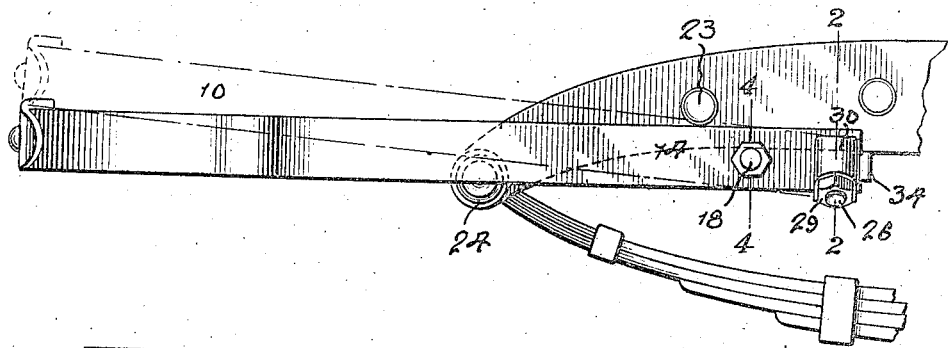
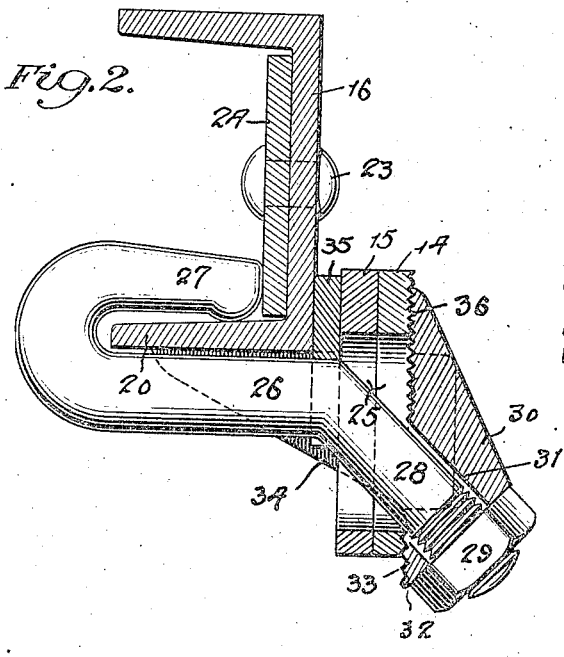
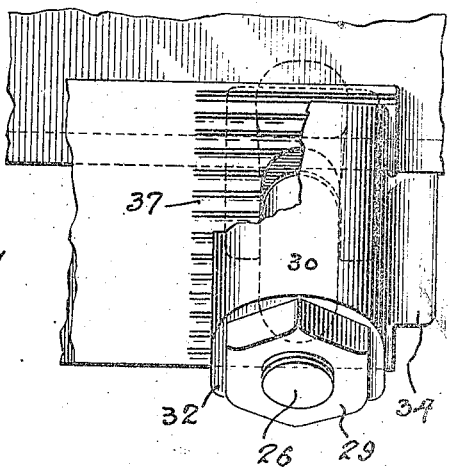
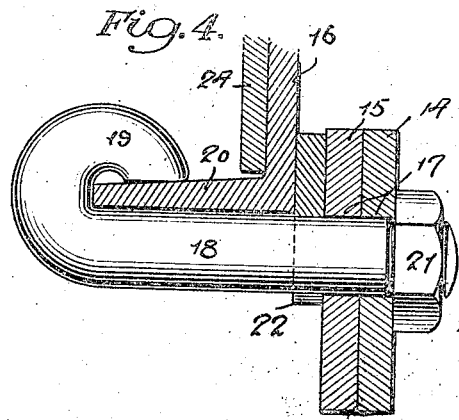
INVENTOR
RICHARD T. NEWTON
BY
ATTORNEYS

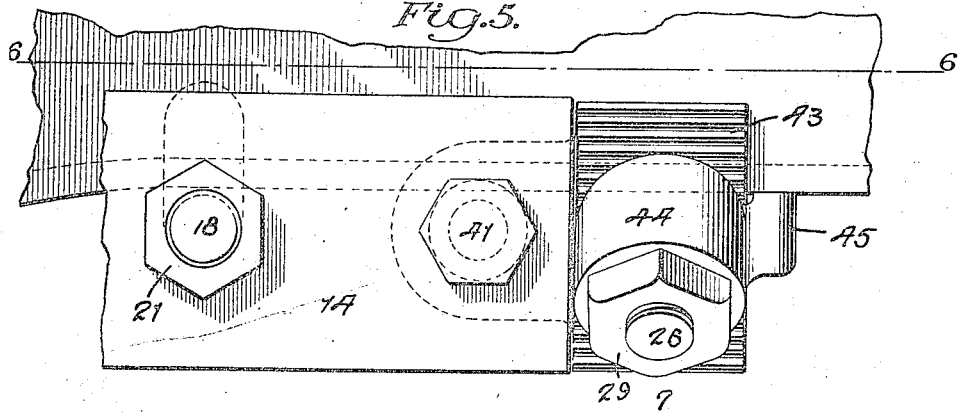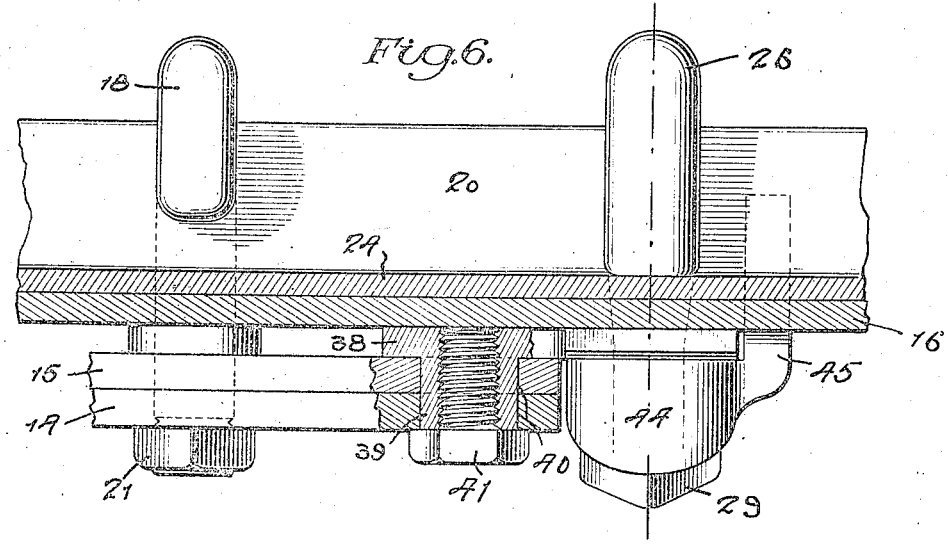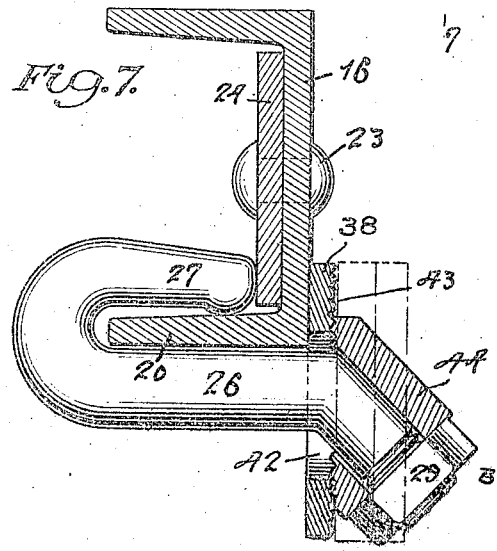

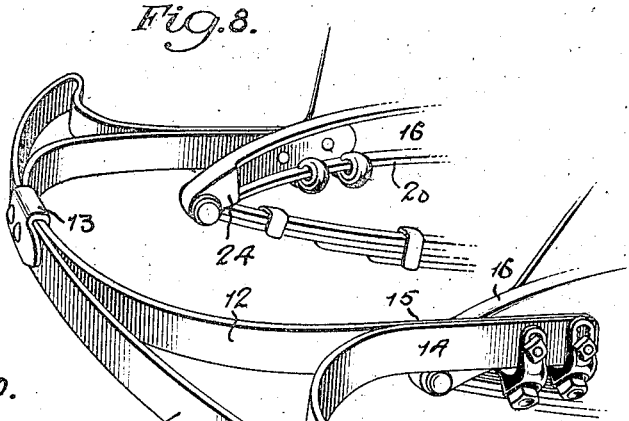
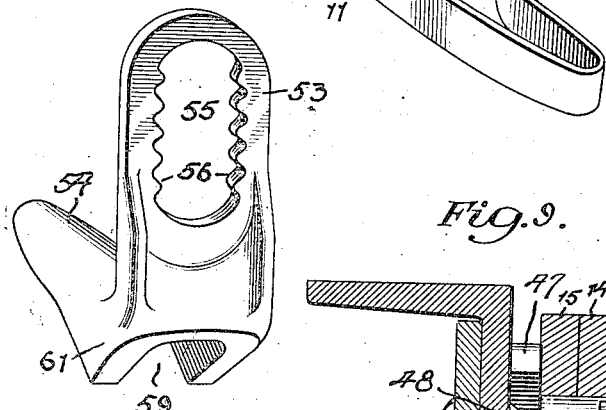
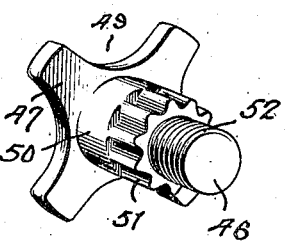
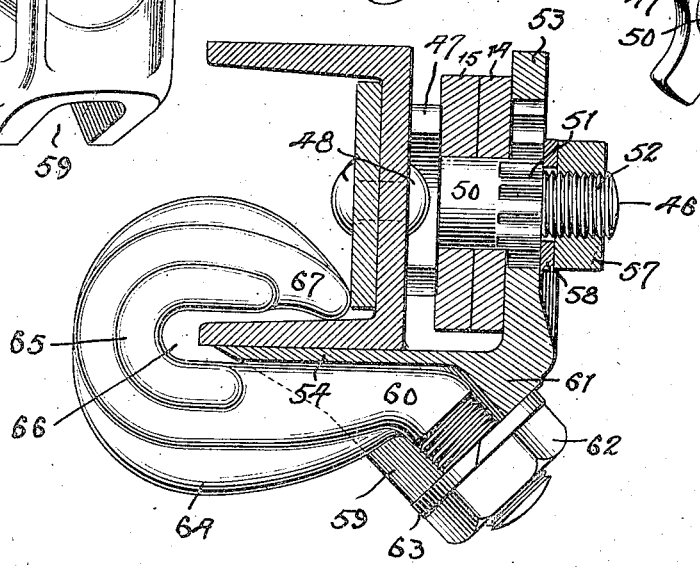

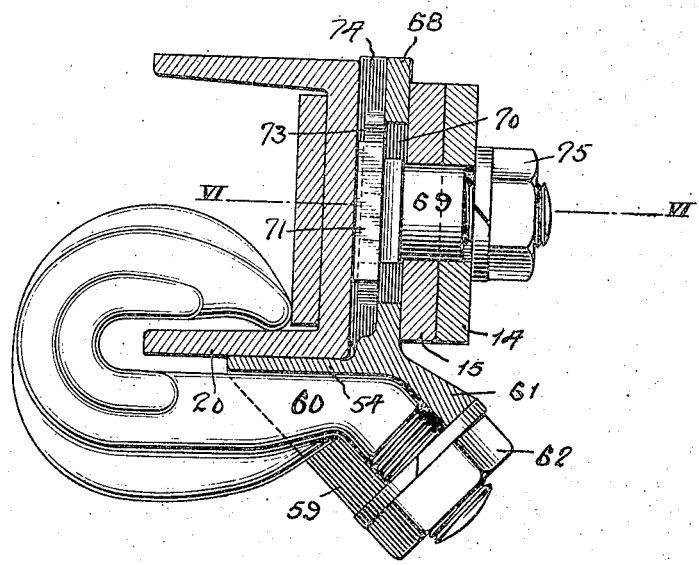
Fig. 12.
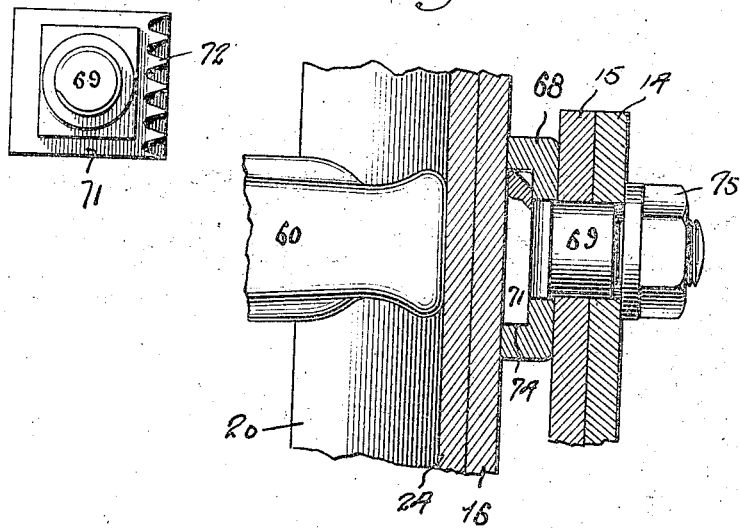
Fig. 14.
Fig. 13.
INVENTOR
RICHARD T. NEWTON
BY
ATTORNEY Patented Sept. 26, 1922.

1,430,464

UNITED STATES PATENT OFFICE.

RICHARD T. NEWTON, OF NEW YORK, N. Y.

BUMPER ATTACHMENT MEANS.

Application filed July 8, 1920. Serial No. 394,616.

*To all whom it may concern:*

Be it known that I, RICHARD T. NEWTON, a citizen of the United States of America, residing at New York city, in the county and State of New York, have invented certain new and useful Improvements in Bumper Attachment Means, of which the following is a specification.

My invention relates to bumper attachment means, and particularly to a device for attaching bumper supporting arms to a chassis frame element of channel or angle section. The object of my invention is to provide means of simple, strong construction well adapted to firmly secure the bumper to its chassis support in proper position, and readily applicable to bumpers and chassis of different types of construction. In certain features the present invention has resemblance to that of my prior Patent No. 1,315,789, dated September 9, 1919.

In the accompanying drawings—

Fig. 1 is a side elevation of an automobile chassis end and bumper showing the latter secured in position by attaching means of one form in which my invention is embodied;

Fig. 2 is a section on the line 2—2, Fig. 1;

Fig. 3 is a partial broken side elevation showing one of the attaching elements;

Fig. 4 is a section on the line 4—4, Fig. 1;

Fig. 5 is a side elevation of a modified construction;

Fig. 6 is a section on the line 6—6, Fig. 5;

Fig. 7 is a section on the line 7—7, Fig. 6;

Fig. 8 is a perspective of a bumper secured to the chassis end by another modified construction;

Fig. 9 is a vertical section through one of the attaching elements and associated parts;

Figs. 10 and 11 are perspectives of details of the attaching device;

Fig. 12 is a vertical section of a further modified form of construction;

Fig. 13 is a section on the line 13—13, Fig. 12; and

Fig. 14 is a plan of a detail.

In the construction illustrated in my patent above mentioned, I have shown a bumper bracket with which are associated bolts for securing it and the bumper supporting arms to the chassis. In the present construction I have dispensed with the bracket and engaged the securing bolts directly with the bumper supporting arms, while in certain other modified constructions a bracket is employed, but in a much simplified construction.

While it is to be understood that the present attaching means are well adapted to secure other types of bumpers than that illustrated, and to hold them to a bracket or other elements attached to a chassis, I have illustrated the invention in connection with a bumper 10 of well-known type comprising a main impact member 11 and a supporting member 12 (Fig. 8) united thereto by a central clip 13, while the supporting arms 14 and 15 of the impact and reenforcing members are carried back and secured to the chassis side bar 16.

In the form shown in Figs. 1 to 4 inclusive, the supporting arms 14 and 15 are pierced in register at 17 to receive the shank of a hook bolt 18, the end 19 of which overlies the lower flange 20 of the chassis side bar. The holding nut 21 screwing upon the shank of the bolt 18 bears directly or through the interposed lock washer (not shown) upon the outer face of the supporting arm 14. A spacing washer 22 is preferably interposed between the supporting arm 15 and the web of the chassis side bar 16 to space the bumper arms slightly from the latter and thus to clear the heads of the rivets 23, which serve to secure the tail of the usual spring-bolt casting 24 to the chassis side bar. The two arms 14 and 15 are also slotted in register at 25 adjacent the ends of the supporting arms to receive a second bolt 26. The latter is of the type shown in my patent above mentioned, having at one end an elongated hook 27 adapted to engage in the corner formed by the junction of the bottom flange 20 of the chassis side bar and the web 16 of the latter, or the side of the casting 24 which lies against said web, as indicated in the drawings. At its other end 28 the bolt is offset at an angle and its terminus threaded to receive the nut 29. Interposed between the nut 29 and the outer face of the bumper supporting arm 14 is a bearing piece 30 pierced or channeled at 31 to accommodate the offset end 28 of the angle bolt and having its bearing face 32 lying at right angles to the shank of the bolt, while the face 33 which bears against the bumper supporting arm is substantially vertical in adjusted position and bears against the bumper arm. The bearing piece 30 is also provided with an offset lug 34 which extends beyond the ends of the bumper supporting arms and underlies the lower flange 20 of the chassis side bar so that when the nut 29 is tightened the draw-up effort of the bolt is exerted in a direction sub-dividing the angle sub-tended between the web 16 and bottom flange 20 of the chassis side bar in substantially the same fashion as explained in my patent above mentioned. A second spacing washer 35 is arranged between the bumper arm 15 and the web 16 of the chassis side bar corresponding to the washer 22 for the bolt 18, and for the same purpose. It is obvious that the slots 25 in the ends of the bumper arms permit angular adjustment of the bumper around the bolts 18 in order to arrange the bumper in horizontal position. This adjustability is indicated by the dotted lines in Fig. 1. In order to lock the parts in adjusted position, the face of the bearing piece 30 is preferably serrated as at 36, and the outer face of the bumper supporting arm 14 similarly serrated at 37 to afford a locking engagement in the adjusted position of these parts.

In Figs. 5, 6 and 7 I have shown a slightly modified construction. As in the construction first described, the securing bolt 18 passes through the registering perforations in the bumper supporting arms 14 and 15. The bolt 26, however, instead of passing through these supporting arms, as in the previous construction, engages a small bracket 38 provided with a stud 39 which passes through a second pair of registering perforations 40 adjacent the ends of the bumper arms and adapted to receive a securing screw-bolt 41, which holds the bumper arms rigidly on the stud 39. The portion of the bracket which extends beyond the ends of the bumper arms is slotted at 42 to receive the shank of the angle bolt 26 and is serrated at 43 to receive and engage the serrated face of the bearing piece 44, which is substantially similar to that first described and similarly provided with an offset lug 45 passing beneath the lower flange 20 of the chassis side bar. In this construction the bracket 38 forms a spacer corresponding to the washer 35 and obviates the necessity for the latter.

In Figs. 8 to 11 I have shown the bumper arms engaged by two angle bolts of like construction instead of by a hook bolt and a co-operating angle bolt as in the two preceding constructions. As in the second construction described, the ends of the bumper arms are pierced in register at spaced points. Engaging these holes are stud bolts 46, the heads 47 of which lie between the chassis and the bumper ends and thus space the latter from the rivet heads 48 previously referred to. The stud heads 47 are specially formed in the shape of a star to accommodate the rivet heads in the interspaces 49 between the points of the star. Moreover, the portion 50 of the stud shank, which, in adjusted position lies within registering holes in the bumper supporting arms, is made of such diameter that it may be freely rotated to adjust the star head with relation to the rivet heads. The portion of the stud shank projecting beyond the ends of the supporting arms is corrugated at 51 and threaded at 52. With each stud bolt co-operates an independent angle bracket having a clamping upright 53 adapted to lie against the outer face of the bumper supporting arms, and secondly, a foot piece 54 passing transversely beneath the latter and the lower flange of the chassis side bar. The upright 53 is slotted at 55 to straddle the stud bolt. The inner margins of this slot are corrugated at 56 to match the corrugated area 51 of the stud bolt, so that the ribs and grooves interlock after the parts have been assembled in properly adjusted position. A nut 57 screwed on the threaded end of the stud and bearing against a lock washer 58 holds the supporting arm of the bumper and bracket rigidly assembled. The foot piece 54 of the bracket is channeled at 59 to receive the shank of the angle bolt 60, by which the bracket is engaged upon the chassis. As here shown the sides of the channel and the lower end of the upright 53 merge into a bearing hub 61, the outer face of which lies substantially at right angles to the offset end of the angle bolt, so that when the nut 62 is tightened through the interposed lock washer 63, its effort is exerted on a line sub-dividing the angle sub-tended between the web and bottom flange of the chassis side bar. The body of the hook bolt is preferably reinforced with central and marginal ribs 64 and 65, respectively, while the bend 66 of the hook is preferably sufficiently wide to clear the inner margin of the lower flange of the chassis side bar, as in the constructions previously described. The nose 67 of the hook is sufficiently long to bear against the inner lower corner of the chassis channel as above described. It is obvious that in this construction a pair of similar attaching devices serves to properly secure the bumper supporting arms in position and at the same time affords ample adjustability to permit the bumper to be properly positioned on chassis horns of different curvature.

In Figs. 12 to 14 I have shown still another modification, which resembles that just described in its general features, but differs therefrom in that the upright 68 of the attaching bracket lies between the supporting arms of the bumper and the web of the side bar of the chassis, and the stud bolt 69 which passes through the registering holes in the bumper arms is accommodated in a slideway 70 in the upright of the bracket. The foot piece 71 of the stud bolt is serrated at 72 in one margin to engage corresponding serrations 73 in the face of the channel 74 in the upright against which it bears, thus locking the parts in adjusted position. This construction lacks the advantage found in the construction just previously described, in that the pressure of the angle bolt upon the bracket does not tend to hold the ends of the bumper arms upon the bracket as well as to secure the bumper to the chassis side bar. The support of the bumper arms upon the bracket is obtained solely by the nut 75.

Various other modifications will readily occur to those dealing with the problem which do not depart from what I claim as my invention.

I claim—

1. Bumper attaching means comprising a bumper supporting arm pierced at longitudinally spaced intervals, independent attaching elements engaging said spaced holes in the bumper arm, and interlocking means associated with the attaching element adjacent the end of the supporting arm for holding the bumper in angularly adjusted position, the spacing of said attaching element being constant in all positions of angular adjustment of the bumper.

2. Bumper attaching means comprising a bumper supporting arm pierced at longitudinally spaced intervals and extending in adjusted position alongside a chassis side bar, independent attaching elements engaging said spaced holes in the bumper arm and comprising hook bolts adapted to pass beneath the chassis side bar and engage the latter, and interlocking means associated with the attaching element adjacent the end of the supporting arm for holding the bumper in angularly adjusted position, the spacing of said attaching element being constant in all positions of angular adjustment of the bumper.

3. Bumper attaching means comprising a bumper supporting arm pierced at longitudinally spaced intervals and extending, in adjusted position, alongside a chassis side bar, independent attaching elements engaging said spaced holes in the bumper arm and comprising hook bolts adapted to pass beneath the chassis side bar and engage the same, together with locking block of angular cross section associated with one of said bolts for holding the bumper in angularly adjusted position.

4. In bumper attaching means, a bumper supporting arm extending in adjusted position alongside a chassis side bar, a bolt for securing said arm to the latter, and an associated member engaged by said bolt and engaging said arm and passing, beyond the end of the latter, transversely beneath the chassis side bar.

5. In bumper attaching means, a bumper supporting arm extending in adjusted position alongside a chassis side bar, a bolt for securing said arm to the latter, and an associated member engaged by the bolt and bearing against the outer face of said arm and extending transversely beneath the chassis side bar.

6. In bumper attaching means, a bumper supporting arm extending in adjusted position alongside a chassis side bar, a bolt for securing said arm to the latter, and an associated member engaged by the bolt and bearing against the outer face of said arm and extending transversely beneath the chassis side bar beyond the end of said arm.

7. In bumper attaching means, a bumper supporting arm extending in adjusted position alongside a chassis side bar and pierced to accommodate a securing bolt, a bolt passing through the arm and engaging the chassis side bar, and a bearing member interposed between the draw-up member of the bolt and the bumper arm and extending transversely beneath the chassis side bar.

8. In bumper attaching means, a bumper supporting arm extending in adjusted position alongside a chassis side bar, and slotted to accommodate a securing bolt, a bolt passing freely through the arm to permit angular adjustment of the bumper, and engaging the chassis side bar, and a bearing member interposed between the draw-up member of the bolt and the bumper arm and extending transversely beneath the chassis side bar.

9. In bumper attaching means, a bumper supporting arm extending in adjusted position alongside a chassis side bar, and pierced to accommodate a securing bolt, an angle hook bolt passing through said arm and engaging with its hooked end around the lower flange of the bar, together with a bearing member interposed between the draw-up member of the bolt and the bumper arm and extending transversely beneath the chassis side bar, the angle end of the bolt and the face of the interposed member against which the draw-up member on the bolt bears being so inclined that the thrust of the draw-up member is exerted in a direction subdividing the angle subtended between the lower flange and the web of the chassis side bar.

10. In the construction specified in claim 9, the piercing in the bumper arm being in the form of a slot to permit angular adjustment of the bumper.

11. In bumper attaching means, a bumper supporting arm slotted to receive a bolt, a bolt passing therethrough, and a bearing member interposed between the draw-up element of the bolt and the bumper supporting arm, said arm and bearing member having their opposed faces shaped to afford a non-slip engagement.

12. In bumper attaching means, a bumper engaging member recessed to receive a bolt stem, and affording an abutment for the draw-up element of the bolt, said member extending transversely beneath and bearing against the lower flange of a chassis side bar in adjusted position.

13. Bumper attaching means comprising a bumper-supporting arm pierced at longitudinally spaced intervals, independent attaching elements engaging said spaced holes in the bumper arm and having a constant distance between them, means permitting the angular adjustment of the bumper on one of said attaching elements as an axis, and interlocking means associated with the other attaching element for holding the bumper in angularly adjusted position.

In testimony whereof I have signed my name to this specification.

RICHARD T. NEWTON.